H. HESS.
CHUCK.
APPLICATION FILED MAR. 19, 1912.

1,131,696.

Patented Mar. 16, 1915.

WITNESSES:
L. E. Morrison
M. R. Manning

INVENTOR
Henry Hess
BY
Rogers, Kennedy & Campbell
ATTORNEYS

THE NORRIS PETERS CO., PHOTO-LITHO., WASHINGTON, D. C.

UNITED STATES PATENT OFFICE.

HENRY HESS, OF PHILADELPHIA, PENNSYLVANIA, ASSIGNOR TO THE HESS-BRIGHT MANUFACTURING COMPANY, A CORPORATION OF DELAWARE.

CHUCK.

1,131,696.   Specification of Letters Patent.   Patented Mar. 16, 1915.

Application filed March 19, 1912. Serial No. 684,708.

*To all whom it may concern:*

Be it known that I, HENRY HESS, a citizen of the United States, residing at Philadelphia, in the county of Philadelphia and State of Pennsylvania, have invented certain new and useful Improvements in Chucks, of which the following is a specification, reference being had therein to the accompanying drawing.

This invention relates to chucks or workholders adapted to be operated to firmly clamp and hold the work, which is to be subjected to shaping, forming or other operations, the objects of the invention being to provide a simple and effective construction in which the work may be handled with great speed and facility in the clamping and releasing actions of the chuck.

My invention is designed with special reference to the handling of annular or sleeve-like forms, such as the casing members of anti-friction bearings, which it is frequently desired to hold in the chuck, so that the internal surface may be operated on, and with this end in view, and in accordance with my invention, the face-plate of the chuck is provided with a fixed work-rest against which the work is seated, and coöperating with which is a clamping jaw, or a series of clamping jaws, movably sustained by the face-plate, so that the active ends of the jaws may be moved to and from the work seat, and operating members movable relatively to the face-plate and adapted to actuate the jaws to clamp the work. In the more specific embodiment of the invention, a plurality of clamping jaws are provided, extending in the general direction of the axis of the chuck and pivoted thereto on a transverse axis, the active ends of the jaws facing inwardly, so that in their pivotal movements these ends will move to and from the face-plate of the chuck, the closing action of the jaws being effected by means of wedge shaped members, movable radially of the face-plate, *i. e.* in a direction transversely of the axis of the chuck. It is manifest, however, that these detailed features of embodiment may be variously changed and modified without departing from the limits of my invention; and it will be understood that the invention is not limited to any particular form or construction of the parts, except in so far as such limitations are specified in the claims.

Figure 1:
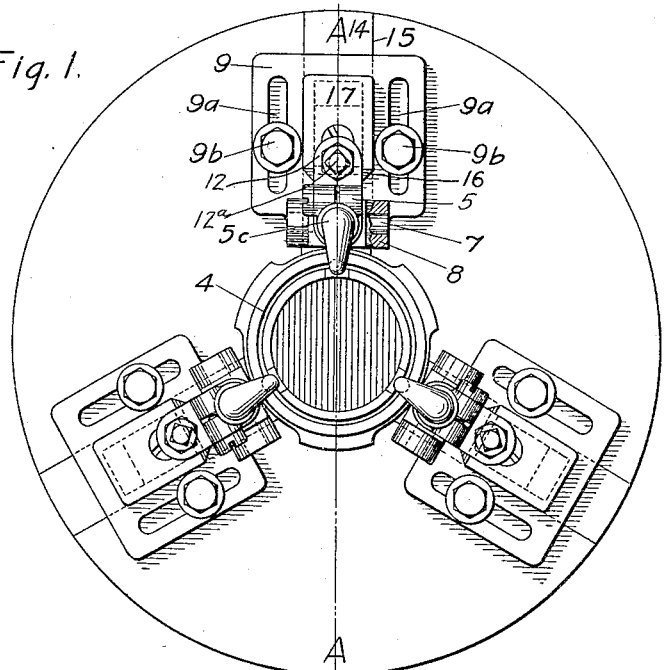
Figure 2:
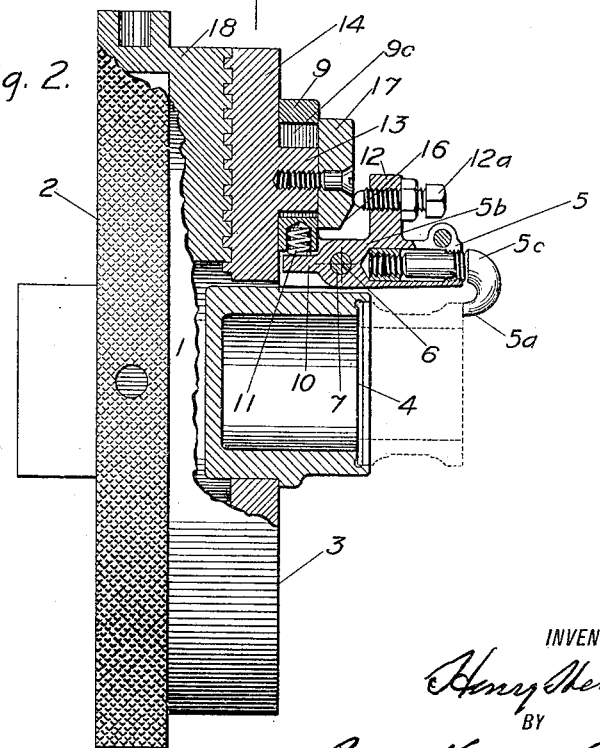

Referring to the drawings: Figure 1 is a front elevation of the chuck, having my invention embodied therein; and Fig. 2 is an axial section of the same on the line A—A.

1 represents the body or frame of the chuck, comprising the back-plate 2 and face-plate 3. The face-plate is provided with a central fixed work support 4, projecting some distance beyond the plane of the plate and adapted to give end support to the work, in the present instance an inner casing member of an anti-friction bearing, which is to be clamped endwise against the support. Arranged around the work support and disposed in the general direction of the axis of the face-plate are a plurality of clamping jaws 5, in the present instance three in number, which jaws are mounted near their inner ends on axes 6, extending transversely with reference to the axis of the face-plate, the active ends 5ª of the jaws facing inwardly and being adapted in the rocking motions of the jaws on their axes, to move toward the work-rest in clamping the work and to move away from the same in releasing the work. In their preferred form each of the jaws comprises an inner body portion 5ᵇ and an outer portion or jaw proper 5ᶜ, which is screwed into the body portion so as to be lengthwise adjustable, the outer end of the portion 5ᶜ being turned inwardly in the form of a hook and carrying the active end 5ª before alluded to. Near its inner end the body portion of the jaw is pivotally mounted by means of a pivot 7 on the axis 6 before alluded to, between ears 8, 8, extending outwardly from a plate or bracket 9, the said pivot being passed through the ears and the body portion of the jaw. The body portion of the jaw is provided with a finger 10, which is acted on by a spring 11 seated in a socket in the plate 9, and tending to rock the jaw on its axis and thereby to throw its outer end away from the work to release the same. The body portion of the jaw is further provided with a radially extending arm 12 carrying a pin 12ª, adjustably mounted in the arm with its inner end disposed on the inner side of the arm, the purpose of which will presently appear. The several plates 9 are bolted to the face-plate of the chuck, each being provided with slots 9ª, 9ª, through which bolts 9ᵇ, 9ᵇ are extended and screwed into the face-plate, this construction permitting the plates 9 to be adjusted radially of the face-plate. The plates 9 are further formed each with a central slot or opening 9ᶜ, through which extends a lug 13 projecting outwardly from a radially movable member 14 in the form of a block, which several blocks are mounted to slide in radial grooves or slots 15 in the face-plate, and the function of which is to actuate the clamping jaws to clamp the work. To effect this action each of the sliding blocks carries an inclined or wedge surface 16 formed on the inner end of a head 17 fixed to the lug 13, the relation of said inclined surfaces to the several pins 12ª being such that when the blocks are moved radially inward, the inclined surfaces will act on the pins and rock the jaws inwardly on their axes, this movement of the jaws causing their active inwardly facing ends to move in the arc of a circle, both inwardly and radially toward the work support, the active ends of the jaws being forced in contact with the outer end of the work and jamming the same forcibly and fixedly against its seat, this movement of the jaws compressing the springs at their opposite ends and placing the same under tension. When the blocks are moved in the opposite direction, the wedge surfaces thereon will be carried free of the pins on the jaws, thereby releasing the same, with the result that the springs will instantly shift the jaws on their axes and throw their active ends outwardly and radially free of the work, thereby releasing the same.

The members or blocks 14 may be mounted in any suitable manner to effect the operations described. I prefer, however, to provide a scroll member 18 engaging grooves in the rear faces of the blocks 14, the motion of the scroll member circumferentially relative to the blocks, causing the latter to be moved in or out radially according to the direction of movement of the scroll member.

From the foregoing description it will be observed that the construction is simple and capable of operation to clamp the work at a plurality of points quickly, positively and forcibly against the work-support; and further, that in releasing the work, the springs, which by the clamping action have been placed under tension, will instantly open the jaws free of the work, so that the latter may be removed or shifted about in position as occasion may demand.

Having thus described my invention, what I claim is:

1. In a chuck, the combination of a face-plate provided with a fixed seat for the work, a clamping jaw mounted on the face-plate and movable at its active end inwardly toward the work seat, an outwardly extending actuating arm on said jaw and radially operating means acting on said arm for actuating the jaw to cause it to clamp the work against the seat.

2. In a chuck, the combination of a face-plate, a clamping jaw mounted thereon and movable to clamp the work toward the face plate, and means movable radially in the direction of the plane of the face-plate for actuating the jaw.

3. In a chuck, the combination of a face-plate provided with a work seat, a clamping jaw on the face-plate movable at its active end inwardly toward the work-support to clamp the work against the same, and means movable radially in the direction of the plane of the face-plate for actuating said jaw.

4. In a chuck, the combination of a face plate, a work clamping jaw mounted thereon and movable to clamp the work, and a member movable relatively to the jaw and radially of the face plate in actuating the clamping jaw to clamp the work.

5. In a chuck, the combination of a face-plate, a work clamping jaw pivoted thereon on an axis extending parallel with the plane of the face-plate, and a member movable radially of the face-plate in actuating the jaw to clamp the work.

6. In a chuck, the combination of a face-plate provided with a work rest, a clamping jaw pivoted to the face-plate on a transverse axis and having an inwardly extending clamping end movable in the pivotal actions of the jaw, to and from the face-plate, and a radially movable member carried by the face-plate and adapted to actuate the jaw.

7. In a chuck, the combination of a face-plate, a plurality of clamping jaws mounted thereon and movable to clamp the work, and a plurality of members movable radially in the direction of the plane of the face-plate and adapted to actuate the clamping jaws.

8. In a chuck, the combination of a face-plate provided with a work rest, a clamping jaw mounted on an axis extending transversely of the axis of the face-plate and movable to clamp the work against the work rest, and a member movable radially of the face-plate and provided with a wedge adapted to engage and actuate the clamping jaw.

9. In a chuck, the combination of a face plate, a plurality of clamping jaws mounted thereon and movable inwardly at their active ends toward the face plate to clamp the work, a plurality of jaw-actuating members movable radially in the direction of the plane of the face plate, and a common operating means for moving said jaw-actuating members in unison.

In testimony whereof I have affixed my signature in presence of two witnesses.

HENRY HESS.

Witnesses:
C. S. BUTLER,
O. F. LUTGE.

Copies of this patent may be obtained for five cents each, by addressing the "Commissioner of Patents, Washington, D. C."